United States Patent
Burgess et al.

(10) Patent No.: US 10,534,580 B2
(45) Date of Patent: Jan. 14, 2020

(54) COMPARING A RUNLENGTH OF BITS WITH A VARIABLE NUMBER

(71) Applicant: ARM LIMITED, Cambridge (GB)

(72) Inventors: Neil Burgess, Austin, TX (US); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 572 days.

(21) Appl. No.: 14/606,217

(22) Filed: Jan. 27, 2015

(65) Prior Publication Data

US 2015/0227346 A1 Aug. 13, 2015

(30) Foreign Application Priority Data

Feb. 10, 2014 (GB) .................................. 1402226.3

(51) Int. Cl.
*G06F 7/74* (2006.01)
(52) U.S. Cl.
CPC ..................................... *G06F 7/74* (2013.01)
(58) Field of Classification Search
CPC . G06F 7/74; G06F 7/764; G06F 7/483; G06F 7/4991; G06F 7/49915; G06F 7/49936
USPC ......................................... 708/205, 211, 498
See application file for complete search history.

(56) References Cited

U.S. PATENT DOCUMENTS

| | | | | |
|---|---|---|---|---|
| 8,788,561 B2 * | 7/2014 | Kan | ......................... | G06F 7/483 |
| | | | | 708/505 |
| 2006/0179093 A1 | 8/2006 | Powell et al. | | |
| 2010/0146023 A1 * | 6/2010 | Boersma | ................... | G06F 7/02 |
| | | | | 708/209 |
| 2012/0259906 A1 | 10/2012 | Kan et al. | | |
| 2014/0149481 A1 * | 5/2014 | Carlough | .............. | G06F 7/4912 |
| | | | | 708/680 |
| 2014/0188967 A1 * | 7/2014 | Rubanovich | ............ | G06F 5/012 |
| | | | | 708/501 |

FOREIGN PATENT DOCUMENTS

WO    WO 2010/061864    6/2010

OTHER PUBLICATIONS

Search Report for GB1402226.3, dated Jul. 17, 2014, three pages.
Schwartz et al., "FPU Implementations with Denormalized Numbers", *IEEE Transactions on Computers*, vol. 54, No. 7, Jul. 2005, pp. 825-836.

* cited by examiner

*Primary Examiner* — Andrew Caldwell
*Assistant Examiner* — Emily E Larocque
(74) *Attorney, Agent, or Firm* — Nixon & Vanderhye P.C.

(57) ABSTRACT

Processing circuitry is provided for comparing a number of adjacent widths having a common value and extending from a starting position within an input number with a runlength specified by a variable number. The circuitry includes a mask generator for generating a mask value in dependence upon the variable number, combination circuitry for performing a logical combination operation upon respective bits within the input number starting from the starting position and corresponding bits within the mask value so as to generate an intermediate value. Result circuitry then generates a result indicative of whether or not the number of adjacent bits is less than or equal to the run length in dependence upon a determination if any bits within the intermediate value have a predetermined value.

13 Claims, 5 Drawing Sheets

V * "1" mask function m[7] = n[2]|n[1]|n[0]
m[6] = n[2]|n[1]
m[5] = n[2]|(n[1] & n[0])
m[4] = n[2]
m[3] = n[2] & (n[1]|n[0])
m[2] = n[2] & n[1]
m[1] = n[2] & n[1] x n[0]
m[0] = 0

COMPARING A RUNLENGTH OF BITS WITH A VARIABLE NUMBER

This application claims priority to GB Patent Application No. 1402226.3 filed 10 Feb. 2014, the entire content of which is hereby incorporated by reference.

BACKGROUND

Field

The present technique relates to the field of data processing systems. More particularly, it relates to data processing systems in which a comparison is required between a number of adjacent bits having a common value within an input number and a runlength specified by a (N+1)-bit variable number.

Description

It is known to provide data processing systems with circuitry to perform operations such as a count of leading zeros within a binary number. Such a count of leading zeros once determined may then be subject to a comparison operation against a variable number to determine whether or not the runlength of the leading zeros does or does not exceed the variable number. This is a two-stage operation.

SUMMARY

At least some embodiments provide an apparatus for comparing a number of adjacent bits having a common value and extending from a starting bit position within an input number with a runlength specified by a (N+1)-bit variable number, where N is a positive integer, said apparatus comprising:

a mask generator configured to generate a $2^{(N+1)}$-bit mask value in dependence upon said (N+1)-bit variable number;

combination circuitry configured to perform a logical combination operation upon respective bits within said input number starting from said starting bit position and corresponding bits within said $2^{(N+1)}$-bit mask value to generate a $2^{(N+1)}$-bit intermediate value; and result circuitry configured to generate a result indicative of whether or not said number of adjacent bits is less than or equal to said runlength in dependence upon a determination if any bits within said $2^{(N+1)}$-bit intermediate value have a predetermined value.

At least some embodiments provide an apparatus for comparing a number of adjacent bits having a common value and extending from a starting bit position within an input number with a runlength specified by a (N+1)-bit variable number, where N is a positive integer, said apparatus comprising:

mask generator means for generating a $2^{(N+1)}$-bit mask value in dependence upon said (N+1)-bit variable number;

combination means for performing a logical combination operation upon respective bits within said input number starting from said starting bit position and corresponding bits within said $2^{(N+1)}$-bit mask value to generate a $2^{(N+1)}$-bit intermediate value; and result means for generating a result indicative of whether or not said number of adjacent bits is less than or equal to said runlength in dependence upon a determination if any bits within said $2^{(N+1)}$-bit intermediate value have a predetermined value.

At least some embodiments provide a method of comparing a number of adjacent bits having a common value and extending from a starting bit position within an input number with a runlength specified by a (N+1)-bit variable number, where N is a positive integer, said method comprising the steps of:

generating a $2^{(N+1)}$-bit mask value in dependence upon said (N+1)-bit variable number;

performing a logical combination operation upon respective bits within said input number starting from said starting bit position and corresponding bits within said $2^{(N+1)}$-bit mask value to generate a $2^{(N+1)}$-bit intermediate value; and generating a result indicative of whether or not said number of adjacent bits is less than or equal to said runlength in dependence upon a determination if any bits within said $2^{(N+1)}$-bit intermediate value have a predetermined value.

The above, and other objects, features and advantages of this disclosure will be apparent from the following detailed description of illustrative embodiments which is to be read in connection with the accompanying drawings.

DRAWINGS

FIG. 1 schematically illustrates a data processing system including processing pipelines which include circuitry for comparing a number of adjacent bits having a common value with a runlength specified by a variable number;

FIG. 2 schematically illustrates comparison circuitry;

FIG. 5 schematically illustrates the action of a mask generator for generating a different form of mask.

EMBODIMENTS

Figure 1:
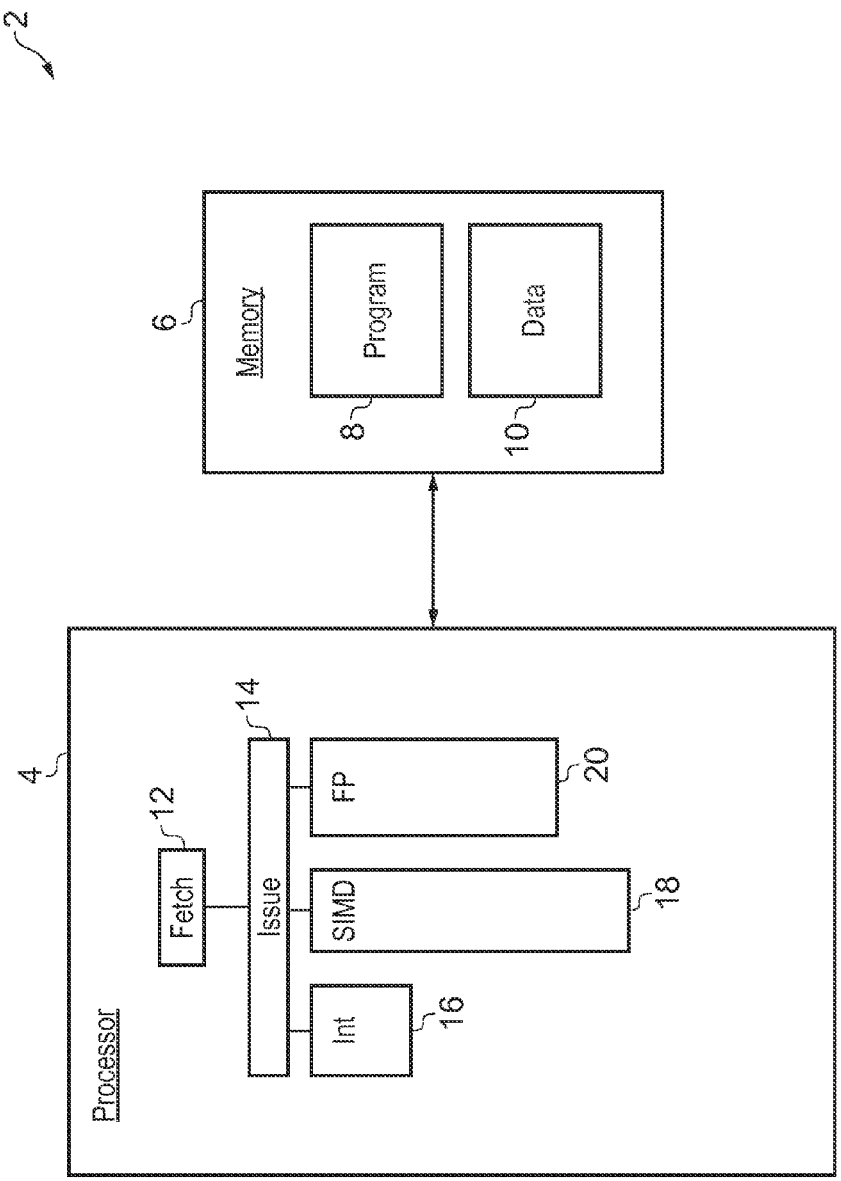

The present technique recognises that the above comparison between a number of adjacent bits having a common value within an input number and a runlength specified by a (N+1) bit variable number may be performed as a combined operation by generating a mask value in dependence upon the variable number, logically combining respective bits within the input number with this mask value to generate an intermediate value and then determining a result from this intermediate value. Thus, rather than performing a count and then comparing the count value against the variable number, the above operation both performs the count and performs the comparison as a combined operation which may be achieved more rapidly.

The logical combination applied by the combination circuitry may be a bitwise logical combination of the input number with the bit mask value.

It will be appreciated by those in this technical field that specific logical operations may be transformed into other logical operations having the same combined effect and accordingly a variety of different bitwise logical combinations may be applied. One particular form of logical combination which may be used is a bitwise AND operation.

The result circuitry may determine the result from the intermediate value in a variety of different ways. One such way is to perform a OR operation upon the bits of the intermediate value.

It will be appreciated that the starting position within the input number from which a number of consecutive bit values having a common value is detected can vary. The starting position could be the least significant bit or a bit position somewhere within the middle portion of the input number.

However, a common use case where the present technique may be applied with advantage is when the starting bit position is a most significant bit within the input number. When the starting position is the most significant bit within the input number, the comparison may be used in some embodiments to indicate if the input value has a number of leading zeros less than the runlength specified by the variable number. Such a count of leading zeros and comparison with a variable number is an operation which arises in various contexts within the field of computer arithmetic, such as within floating point arithmetic when the number of leading zeros of a mantissa value may be compared with an exponent value of the floating point number to determine a shift amount to be applied to the mantissa value.

It will be appreciated that the mask value formed may take a variety of different forms. One useful form is when the mask value has a number of consecutive leading bit values of 1 given by the variable number plus one with the remainder of the mask value being formed of all 0 bit values.

It is advantageous if the mask generator can produce the desired mask value rapidly. In order to achieve this the mask generator may comprise combinatorial logic configured to generate the mask value from the variable number. In some embodiments said (N+1)-bit variable number comprises bit values n[i], where i is a value between N and 0; and said mask generator comprises combinatorial logic configured to generate said $2^{N+1}$-bit mask value in accordance with:

said $2^{N+1}$-bit mask value comprises bit values $m_N[j]$, where j is a value between $2^{N+1}-1$ and 0;

$m_0[1]=1$ and $m_0[0]$ is given by said (N+1)-bit variable number when N=0;

$m_N[p]=n[N]$ OR $m_{N-1}[p-2^N]$, where p is a value between $2^N$ and $2^{N+1}-1$; and $m_N[p]=n[N]$ AND $m_{N-1}[p]$, where p is a value between 0 and $2^N-1$.

Another form of mask value which may sometimes be used is that in which the mask value has a number of consecutive leading bit values of 1 given by the variable number followed by the remainder of the mask value being formed by a 0 bit value.

Another way in which the mask generator may generate a useful mask such as the above using combinatorial logic is one in which said (N+1)-bit variable number comprises bit values n[i], where i is a value between N and 0; and said mask generator comprises combinatorial logic configured to generate said $2^{N+1}$-bit mask value in accordance with:

said $2^{N+1}$-bit mask value comprises bit values $m_N[j]$, where j is a value between $2^{N+1}-1$ and 0;

$m_0[1]$ is given by said (N+1)-bit variable number when N=0 and $m_0[0]=0$;

$m_N[p]=n[N]$ OR $m_{N-1}[p-2^N]$, where p is a value between $2^N$ and $2^{N+1}-1$; and $m_N[p]=n[N]$ AND $m_{N-1}[p]$, where p is a value between 0 and $2^N-1$.

In some embodiments the combination circuitry may be configured to generate different bits of the intermediate values at different times. For example, some bits of the mask value may be available more rapidly than other bits and since the combination circuitry performs a bitwise combination, early generation of an intermediate value bit when the corresponding mask bit has been generated early may be achieved. This permits the result circuitry to be connected to the combination circuitry so as to receive and start processing some bits of the intermediate value that have been generated while other bits of the intermediate value have yet to be generated. Starting the processing of the bits of the intermediate value earlier in this way can advantageously facilitate the more rapid generation of the result value.

FIG. 1 schematically illustrates a data processing system 2 including a processor 4 and a memory 6. The memory 6 stores program instructions 8 and data 10. A processor 4 performs processing operations specified by the program instructions 8 and manipulates the data 10 using a processing pipeline including a fetch stage 12, an issue stage 14 and a plurality of different execution pipelines 16, 18, 20. The execution pipelines may include an integer pipeline 16, a SIMD pipeline 18 and a floating point pipeline 20. The floating point pipeline 20 manipulates floating point exponent values and mantissa values. In the operation of the floating point pipeline 20 it is desired to compare a number of leading zeros within a mantissa value with an exponent value to determine an appropriate shift to be applied during processing of the mantissa value. The present techniques may be usefully employed to perform such a comparison more rapidly than by first counting the number of leading zeros to generate a leading zero count number and then comparing that leading zero count number with the exponent value to determine their relative sizes.

Figure 2:
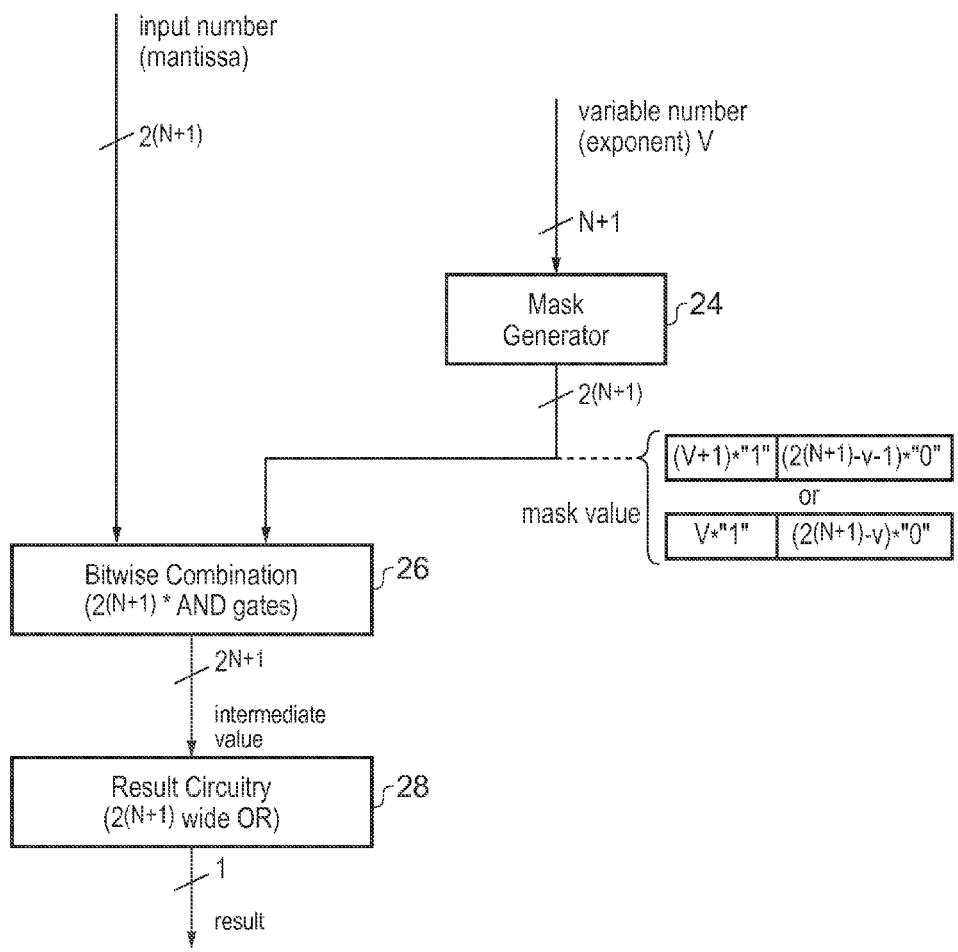

FIG. 2 schematically illustrates comparison circuitry 22 for comparing a number of adjacent bits having a common value and extending from a starting position within an input number (such as a least significant bit position, a most significant bit position or a position somewhere within the body of the input number) with a runlength specified by a variable number V. A mask generator 24 receives the variable number V, which is an (N+1)-bit number and may represent the exponent of a floating point number. The mask generator 24 includes combinatorial logic (e.g. AND gates and OR gates) which serve to generate a $2^{(N+1)}$-bit mask value. This mask value may, for example, comprise (V+1) consecutive "1" bit values followed by the remainder of the mask value being "0" bit values. In other applications (e.g count leading sign applications) the mask value may comprise V consecutive "1" bit values followed by the remainder of the mask value being formed of "0" bit values.

The mask value generated by the mask generator 24 is supplied as one input to combination circuitry 26. The other input to the combination circuitry 26 is the input number (e.g. mantissa) which is a $2^{(N+1)}$-bit number. The combination circuitry 26 may perform a bitwise combination using respective AND gates which perform an AND operation on corresponding bits within the input number and the mask value. The output from the combination circuitry 26 is a $2^{(N+1)}$-bit intermediate value which is passed to result circuitry 28. The result circuitry generates a result value in dependence upon the intermediate value which indicates whether or not the number of adjacent bits having a common value (e.g. number of leading zeros) is less than a runlength specified by the variable input number V. In some embodiments the result circuitry may perform a $2^{(N+1)}$ bit wide OR operation upon the bits of the intermediate value in order to generate a single output bit as the result value.

Figure 3:
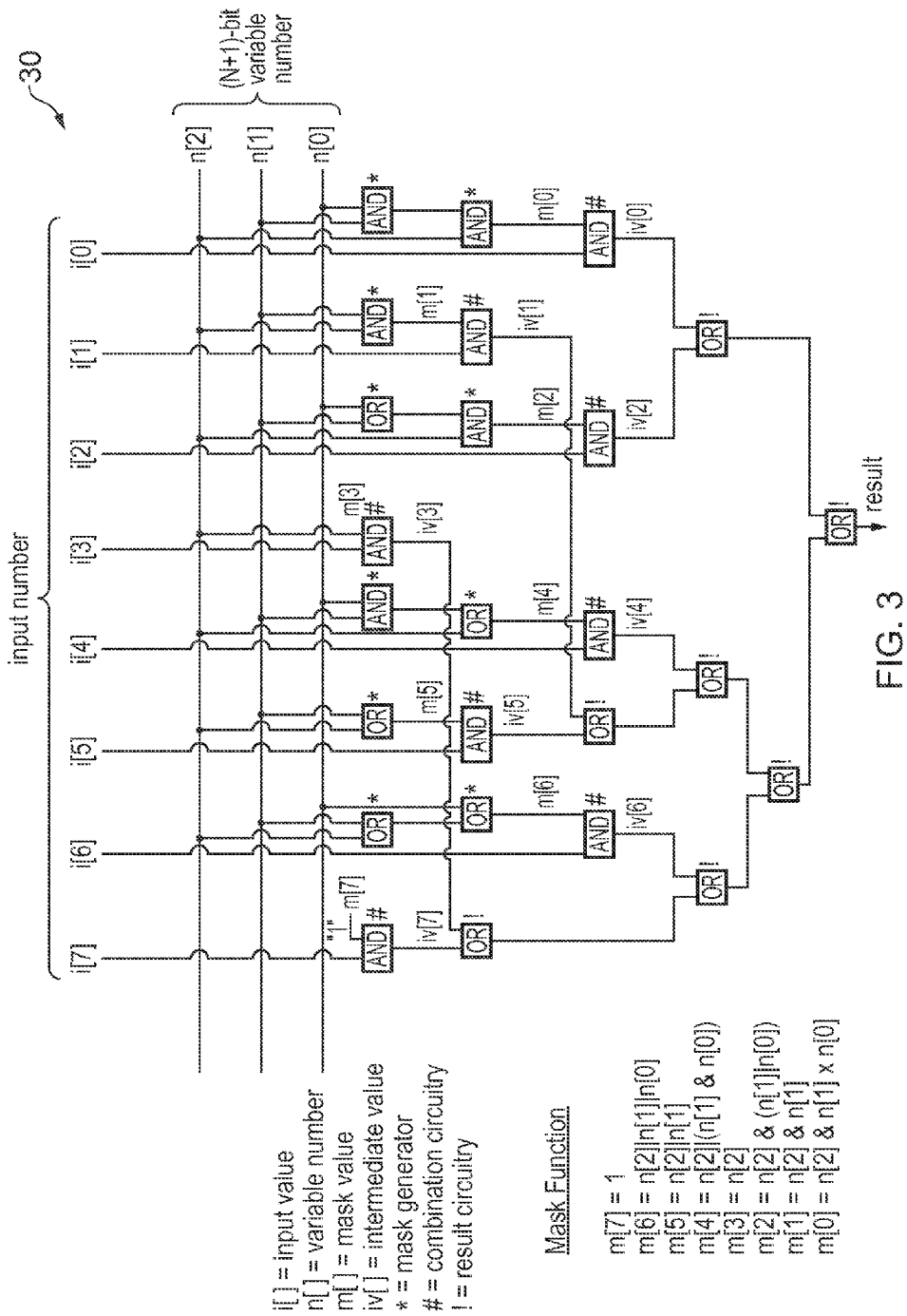
FIG. 3 illustrates example comparison circuitry for comparing whether the number of leading zeros within an 8-bit input number is less than a number specified by a 3-bit variable number.

FIG. 3 schematically illustrates comparison circuitry 30 serving to compare the number of leading zeros within an 8-bit input number with a 3-bit variable number. In the example shown, combinatorial logic in the form of AND gates and OR gates is used to form the mask generator, the combination circuitry and the result circuitry. Combinatorial logic gates forming part of the mask generator are marked with a "*". Combinatorial logic gates forming part of the combination circuitry are marked with an "#". Combinatorial logic gates forming part of the result circuitry are marked with a "!".

FIG. 3 also includes an indication of how the different bits of the mask value may be logically derived from the 3-bit variable number. It will be seen that some of these mask bits may be more directly derived from the variable number than others. Such mask bits are available more rapidly and accordingly can be combined within the combination circuitry with corresponding bits within the input number more rapidly. This means that the corresponding bits of the intermediate value iv[ ] are generated more rapidly and may be passed to the results circuitry to start being processed to form the result value via a cascading sequence of OR gates. The different horizontal levels within the combinatorial logic gates illustrated in FIG. 3 correspond to respective logic gate depths within the processing. More rapid processing is achieved when the logic gate depth is fewer between the inputs and the outputs. Extending the combination circuitry and the results circuitry closer to the inputs such that some bits of the intermediate value are generated before others has the advantage of allowing a reduction in the logic depth.

It will be appreciated by those in this technical field that FIG. 3 employs two-input gates and that in practice gates with higher numbers of inputs may be used to reduce the logic gate depth further.

Figure 4:
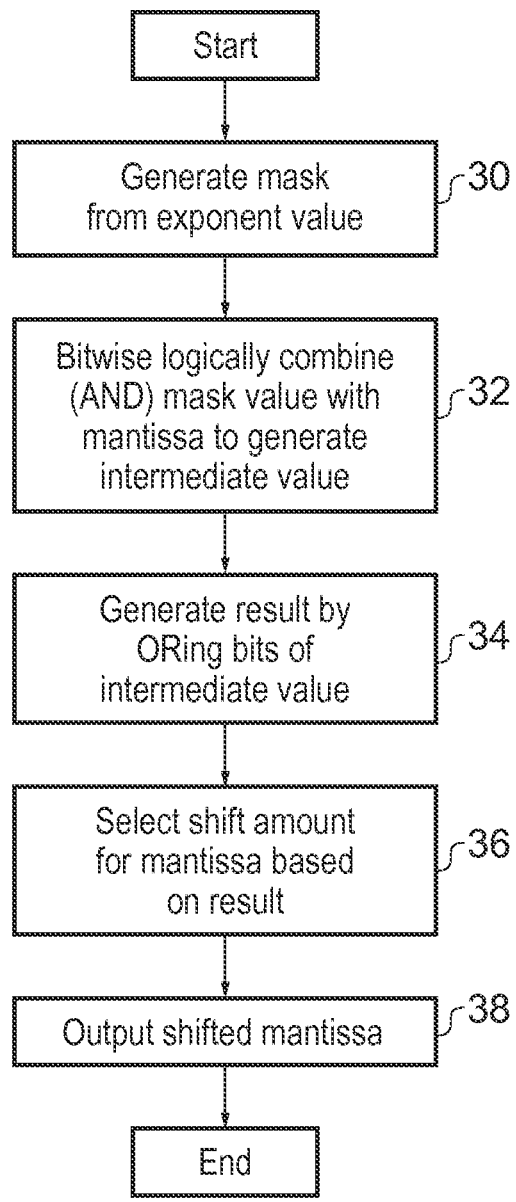
FIG. 4 is a flow diagram schematically illustrating the operation of the circuitry of FIGS. 2 and 3.

FIG. 4 is a flow diagram schematically illustrating the operation of the circuitry of FIGS. 2 and 3 in performing a combined count leading zero and compare operation. At step 30 a mask is generated from an exponent value which is the variable number. At step 32 a bitwise logical combination of the mask value and a mantissa value, which is the input number, is performed so as to generate an intermediate value. At step 34 the result value is generated by an ORing of all of the bits which form the intermediate value. Step 36 selects a shift amount to be applied to the mantissa based upon the result, i.e. to take account of one of the leading zero count or the exponent value depending upon which is appropriate to apply. Step 38 then outputs the shifted mantissa value.

The mask function illustrated in FIG. 3 is one suitable for generating an 8-bit mask value for counting the leading zeros within an input number. More generally combinatorial logic for forming the mask generator for generating a $2^{(N+1)}$-bit mask value may be derived iteratively from the relationship that follows:

said (N+1)-bit variable number comprises bit values n[i], where i is a value between N and 0; and said mask generator comprises combinatorial logic configured to generate said $2^{N+1}$-bit mask value in accordance with:

said $2^{N+1}$-bit mask value comprises bit values $m_N[j]$, where j is a value between $2^{N+1}-1$ and 0;

$m_0[1]=1$ and $m_0[0]$ is given by said (N+1)-bit variable number when N=0;

$m_N[p]=n[N]$ OR $m_{N-1}[p-2^N]$, where p is a value between $2^N$ and $2^{N+1}-1$; and $m_N[p]=n[N]$ AND $m_{N-1}[p]$, where p is a value between 0 and $2^N-1$.

FIG. 5 illustrates the mask function which may be used to generate a 8-bit mask containing V leading "1"s values followed by all zeros. More generally the combinatorial logic that may be employed within a mask generator to generate such a mask value may be derived from the following iterative relationship:

said (N+1)-bit variable number comprises bit values n[i], where i is a value between N and 0; and said mask generator comprises combinatorial logic configured to generate said $2^{N+1}$-bit mask value in accordance with:

said $2^{N+1}$-bit mask value comprises bit values $m_N[j]$, where j is a value between $2^{N+1}-1$ and 0;

$m_0[1]$ is given by said (N+1)-bit variable number when N=0 and $m_0[0]=0$;

$m_N[p]=n[N]$ OR $m_{N-1}[p-2^N]$, where p is a value between $2^N$ and $2^{N+1}-1$; and $m_N[p]=n[N]$ AND $m_{N-1}[p]$, where p is a value between 0 and $2^N-1$.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for comparing a number of adjacent bits having a common value and extending from a starting bit position within an input number with a runlength specified by a (N+1)-bit variable number, where N is a positive integer, said apparatus comprising:

a mask generator configured to receive said (N+1)-bit variable number and further configured to generate a $2^{(N+1)}$-bit mask value in dependence upon said (N+1)-bit variable number;

combination circuitry configured to receive said $2^{(N+1)}$-bit mask value and said input number, and further configured to perform a logical combination operation upon respective bits within said input number starting from said starting bit position and corresponding bits within said $2^{(N+1)}$-bit mask value to generate a $2^{(N+1)}$-bit intermediate value; and result circuitry configured to receive said $2^{(N+1)}$-bit intermediate value and further configured to generate a result indicative of whether or not said number of adjacent bits is less than or equal to said runlength in dependence upon a determination if any bits within said $2^{(N+1)}$-bit intermediate value have a predetermined value, wherein said starting bit position is a most significant bit within said input number;

said (N+1)-bit variable number comprises bit values n[i], where i is a value between N and 0;

said combination circuitry comprises AND logic gates;

said result circuitry comprises OR logic gates; and said mask generator comprises combinatorial logic gates configured to generate said $2^{N+1}$-bit mask value in accordance with:

said $2^{N+1}$-bit mask value comprises bit values $m_N[j]$, where j is a value between $2^{N+1}-1$ and 0;

$m_0[1]=1$ and $m_0[0]$ is given by said (N+1)-bit variable number when N=0;

$m_N[p]=n[N]$ OR $m_{N-1}[p-2^N]$, where p is a value between $2^N$ and $2^{N+1}-1$, and said OR is an OR logic gate; and $m_N[p]=n[N]$ AND $m_{N-1}[p]$, where p is a value between 0 and $2^N-1$, and said AND is an AND logic gate.

2. Apparatus as claimed in claim 1, wherein said logical combination is a bitwise logical combination of said input number and said $2^{(N+1)}$-bit mask value.

3. Apparatus as claimed in claim 2, wherein said logical combination is an AND operation.

4. Apparatus as claimed in claim 1, wherein said result circuitry performs an $2^{(N+1)}$-bit OR operation upon bits of said $2^{(N+1)}$-bit intermediate value.

5. Apparatus as claimed in claim 1, wherein said result indicates if said input number has a number of leading zeros less than said runlength.

6. Apparatus as claimed in claim 1, wherein said mask generator is configured to generate a said $2^{N+1}$-bit mask value having a number of consecutive leading bit values of 1 given by said (N+1)-bit variable number plus 1 followed by all 0 bit values.

7. Apparatus as claimed in claim 1, wherein said mask generator is configured to generate a said $2^{N+1}$-bit mask value having a number of consecutive leading bit values of 1 given by said (N+1)-bit variable number followed by all 0 bit values.

8. Apparatus as claimed in claim 1, wherein said starting bit position is a least significant bit within said input number.

9. Apparatus as claimed in claim 1, wherein said combination circuitry is configured to generate different bits of said $2^{(N+1)}$-bit intermediate value at different times and said result circuitry is connected to said combination circuitry to receive and start processing some bits of said $2^{(N+1)}$-bit intermediate value that have been generated while other bits of said $2^{(N+1)}$-bit intermediate value have yet to be generated.

10. Apparatus as claimed in claim 1, comprising floating point arithmetic unit configured to performing arithmetic operations upon floating point numbers having an exponent value and a mantissa value and wherein said input number is a mantissa value and said (N+1)-bit variable number is an exponent value.

11. Apparatus a claimed in claim 10, wherein said result is used to control whether to shift said mantissa a shift amount given by:
a number of leading zeros of said mantissa, or
said exponent value.

12. Apparatus for comparing a number of adjacent bits having a common value and extending from a starting bit position within an input number with a runlength specified by a (N+1)-bit variable number, where N is a positive integer, said apparatus comprising:
a mask generator configured to receive said (N+1)-bit variable number and further configured to generate a $2^{(N+1)}$-bit mask value in dependence upon said (N+1)-bit variable number;

combination circuitry configured to receive said $2^{(N+1)}$-bit mask value and said input number, and further configured to perform a logical combination operation upon respective bits within said input number starting from said starting bit position and corresponding bits within said $2^{(N+1)}$-bit mask value to generate a $2^{(N+1)}$-bit intermediate value; and result circuitry configured to receive said $2^{(N+1)}$-bit intermediate value and further configured to generate a result indicative of whether or not said number of adjacent bits is less than or equal to said runlength in dependence upon a determination if any bits within said $2^{(N+1)}$-bit intermediate value have a predetermined value, wherein said starting bit position is a most significant bit within said input number;

said (N+1)-bit variable number comprises bit values n[i], where i is a value between N and 0;

said combination circuitry comprises AND logic gates;

said result circuitry comprises OR logic gates; and said mask generator comprises combinatorial logic gates configured to generate said $2^{N+1}$-bit mask value in accordance with:

said $2^{N+1}$-bit mask value comprises bit values $m_N[j]$, where j is a value between $2^{N+1}-1$ and 0;

$m_0[1]$ is given by said (N+1)-bit variable number when N=0 and $m_0[0]=0$;

$m_N[p]=n[N]$ OR $m_{N-1}[p-2^N]$, where p is a value between $2^N$ and $2^{N+1}-1$, and said OR is an OR logic gate; and $m_N[p]=n[N]$ AND $m_{N-1}[p]$, where p is a value between 0 and $2^N-1$, and said AND is an AND logic gate.

13. Apparatus for comparing a number of adjacent bits having a common value and extending from a starting bit position within an input number with a runlength specified by a (N+1)-bit variable number, where N is a positive integer, said apparatus comprising:
means for generating a $2^{(N+1)}$-bit mask value in dependence upon said (N+1)-bit variable number;
means for performing a logical combination operation upon respective bits within said input number starting from said starting bit position and corresponding bits within said $2^{(N+1)}$-bit mask value to generate a $2^{(N+1)}$-bit intermediate value; and
means for generating a result indicative of whether or not said number of adjacent bits is less than or equal to said runlength in dependence upon a determination if any bits within said $2^{(N+1)}$-bit intermediate value have a predetermined value.

* * * * *